United States Patent [19]

Scott

[11] Patent Number: 5,397,590

[45] Date of Patent: Mar. 14, 1995

[54] PREPARATION OF CAVIAR-LIKE COMPOSITIONS

[76] Inventor: George W. Scott, 310 S. 4th Ave., Seguin, Wash. 98382

[21] Appl. No.: 215,045

[22] Filed: Mar. 21, 1994

[51] Int. Cl.[6] .............................................. A23L 1/328
[52] U.S. Cl. .................................. 426/589; 426/629; 426/643; 426/802
[58] Field of Search ............... 426/589, 629, 638, 643, 426/802, 104

[56] References Cited

U.S. PATENT DOCUMENTS

| 4,144,353 | 3/1979 | Zaragoza | 426/104 X |
| 4,202,908 | 5/1980 | Nesmeyanov et al. | 426/104 X |

FOREIGN PATENT DOCUMENTS

| 55-99176 | 7/1980 | Japan | 426/643 |
| 57-163469 | 10/1982 | Japan | 426/643 |
| 60-75260 | 4/1985 | Japan | 426/643 |

*Primary Examiner*—Arthur L. Corbin
*Attorney, Agent, or Firm*—Gilbert Kivenson

[57] ABSTRACT

A method for producing caviar-like compositions by mixing and blending dried papaya seeds with an edible oil, a fish flavoring, a thickener and seasoning.

2 Claims, No Drawings

PREPARATION OF CAVIAR-LIKE COMPOSITIONS

BACKGROUND OF THE INVENTION

Caviar, a delicacy made from the roe of sturgeons, has been popular as an appetizer and food staple for many centuries. Its consumption has been limited to the nobility and the wealthy because of its very high cost.

Host of the world's supply of sturgeon comes from rivers near the Caspian Sea. In the past the Soviet Union had established a state-owned monopoly and had been stocking the waterways. With the collapse of the Soviet Union sturgeon fishing has been opened to other countries who are using less-than-conservative fishing techniques to seize their share of the world market. This has resulted in a growing threat to the sturgeon as well as a further increase in prices.

It is an objective of the present invention to provide a synthetic caviar which is similar in taste to the genuine product. The present invention will permit a wider enjoyment of caviar-like products and may also encourage more conservative fishing practices by causing prices to fall and may have the end result of preserving the sturgeon species.

DESCRIPTION OF THE INVENTION

The present invention utilizes the discovery that the properties of a natural product, the seed of the papaya fruit, can be used to simulate the taste of sturgeon roe. The seeds of the mature papaya are spheroids of approximately 2 to 4 mm in diameter. The seeds are porous in their dried state and will absorb outside substances such as oils, fish flavors and spices. The seeds also have a residual taste similar to that of roe.

In the first step for carrying out the present invention, papaya seeds are boiled in water for about 15 minutes to remove papaya enzyme and to expand the pores. The water is then decanted and the seeds dried. A paste having the following composition is then prepared:

| | |
|---|---|
| Dried papaya seeds | Approx. 20 to 25 parts by weight |
| Olive oil | Approx. 40 to 60 parts by weight |
| Fish meal | Approx. 40 to 50 parts by weight |
| Corn starch | Approx. 10 to 15 parts by weight |
| Chili powder | Approx. .05 to .10 parts by weight |

The dried papaya seeds are initially dispersed in the olive oil using mechanical stirring. The fish meal is next added slowly with continued mixing until uniformly dispersed. The corn starch is then mixed in until a paste-like slurry is obtained. This step will require about 15 minutes. A small amount of chili powder is finally blended into the slurry.

Other compositions may also be used within the scope of the present invention. The oil used can be canola or safflower. The fish flavor can be obtained from cod fish flakes or sliced anchovies. Algae or tragacanth may be used instead of corn starch. Pepper or paprika can be substituted for chili powder.

What is claimed:

1. A method for producing caviar-like compositions comprising blending and physically mixing into a paste by stirring boiled and dried papaya seeds, an edible oil medium, a fish flavoring, a thickener, and a seasoning until a uniform mix is obtained.

2. A method for producing caviar-like compositions as described in claim 1 in which said oil medium is selected from the group consisting of olive oil, safflower oil and canola oil, said fish flavoring is selected from the group consisting of fish meal, cod fish flakes and sliced anchovies said thickener is selected from the group consisting of corn starch, algae and tragacanth and said seasoning is selected from the group consisting of chili powder, pepper and paprika.

* * * * *